Figure 1:
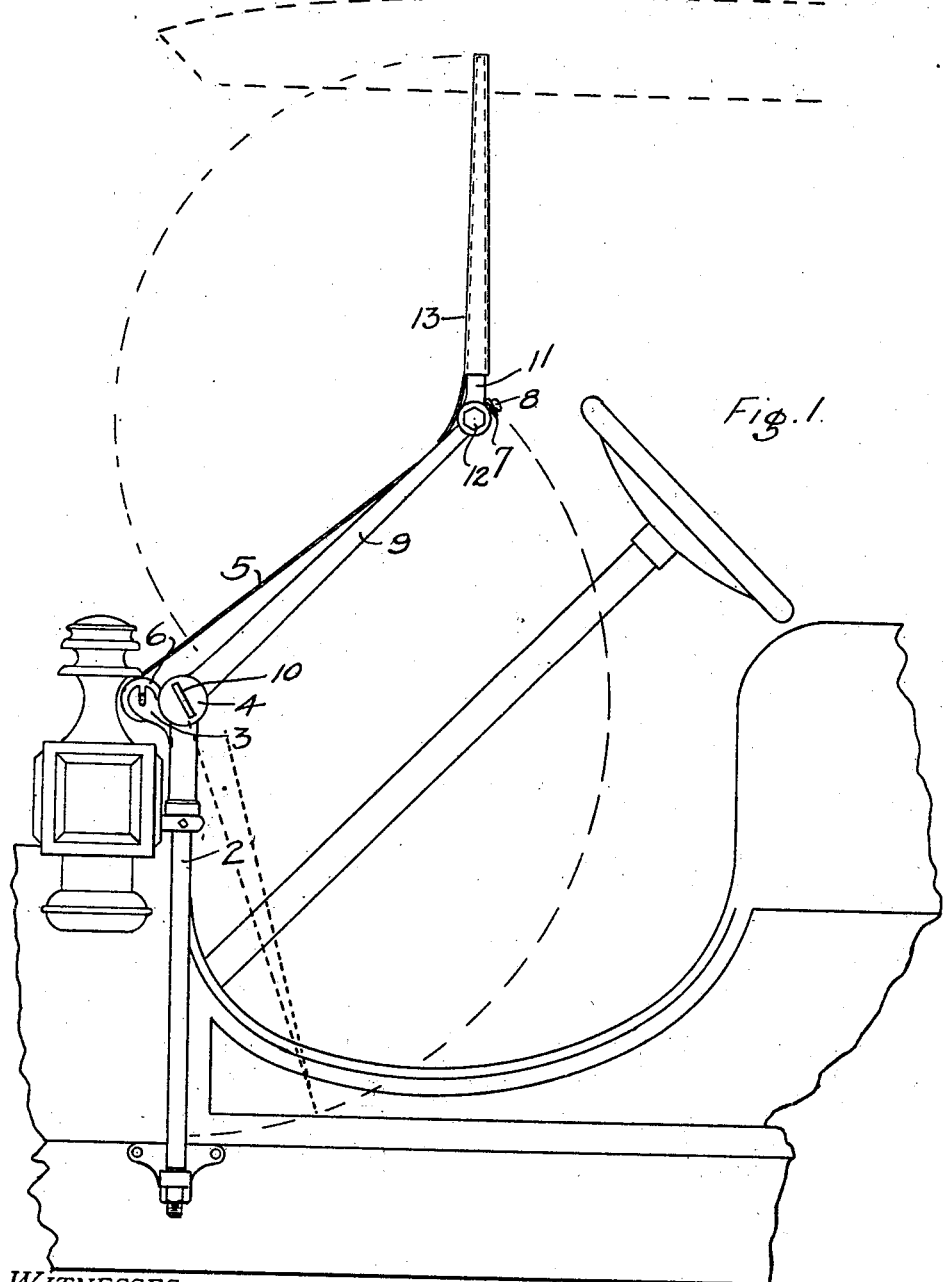

J. E. STEVENSON.
FOLDING STORM FRONT FOR AUTOMOBILES.
APPLICATION FILED OCT. 19, 1909.

1,024,658.

Patented Apr. 30, 1912.
3 SHEETS—SHEET 1.

WITNESSES:

INVENTOR
James E. Stevenson
BY
Attorney

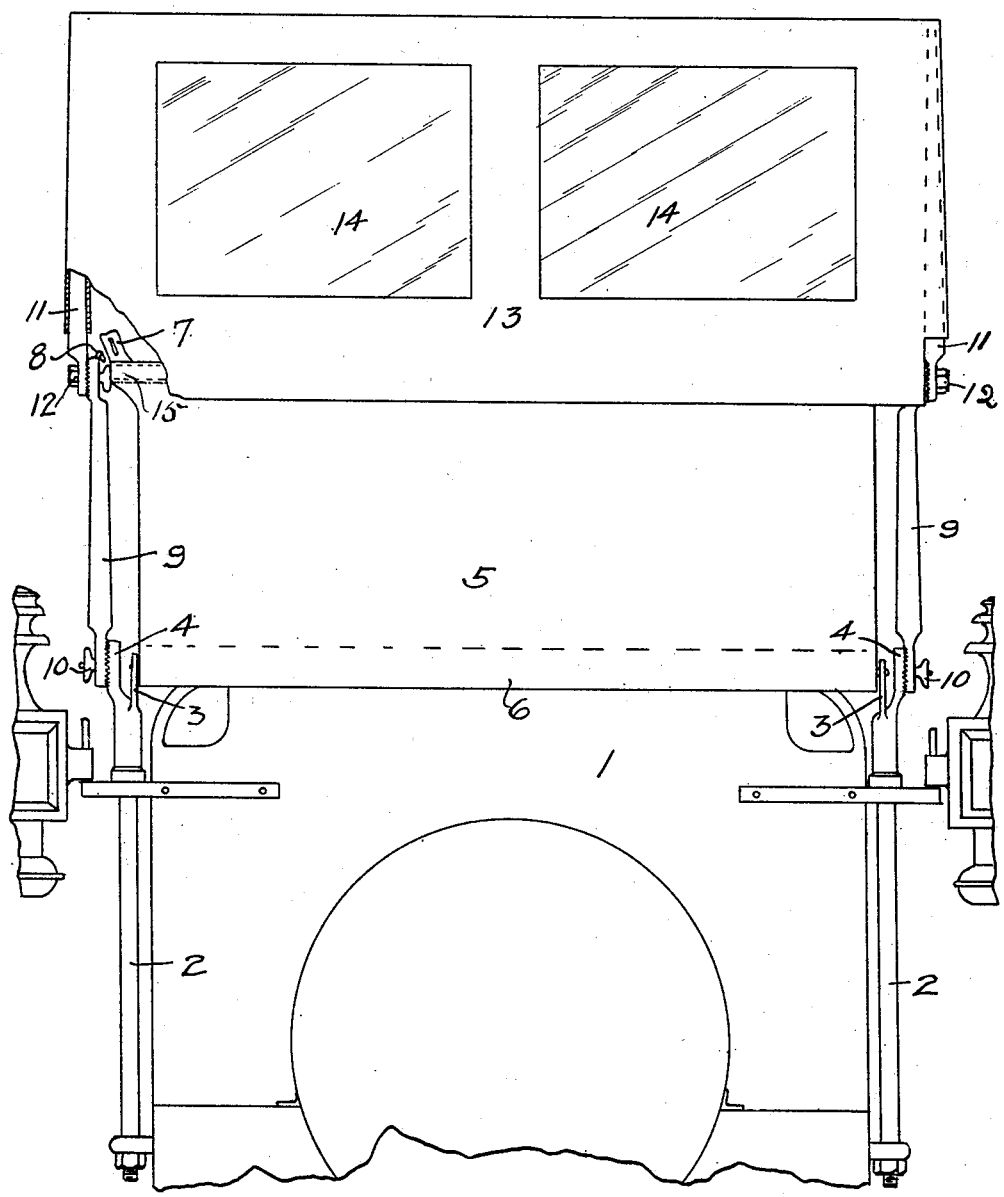

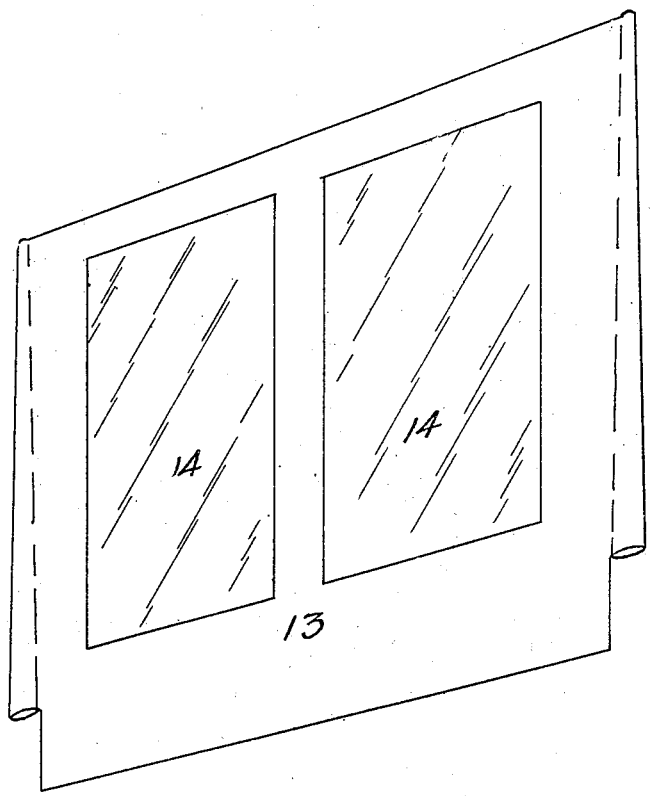

UNITED STATES PATENT OFFICE.

JAMES E. STEVENSON, OF PUYALLUP, WASHINGTON.

FOLDING STORM-FRONT FOR AUTOMOBILES.

1,024,658.   Specification of Letters Patent.   Patented Apr. 30, 1912.

Application filed October 19, 1909. Serial No. 523,532.

*To all whom it may concern:*

Be it known that I, JAMES E. STEVENSON, a citizen of the United States of America, residing at Puyallup, in the county of Pierce and State of Washington, have invented certain new and useful Improvements in Folding Storm-Fronts for Automobiles, of which the following is a specification, reference being had therein to the accompanying drawing.

This invention relates to wind and storm shields for vehicles and has for its objects to provide an effective and cheap shield which can be easily adjusted; which is light in weight; and which can be folded up and removed from sight without adding materially to the baggage of the automobile. I attain these and other objects by the devices illustrated in the accompanying drawings, in which—

Figure 1 is a side elevation showing the storm-front in use; Fig. 2 is a front elevation thereof; and Fig. 3 is a perspective view of the upper removable flap.

Similar numerals of reference refer to similar parts throughout the several views.

To each side of the dash board 1 of the automobile is fastened a vertical rod 2 which branches at its upper end into a roller socket or holder 3 and an arm socket 4. The canvas apron 5 is mounted on a spring roller 6, similar to an ordinary window-shade roller, which is removably supported by the two roller holders 3, and which extends horizontally between them across the front of the dash board 1. The apron 5 has a holding loop 7 secured to each corner of the free end thereof and adapted to engage the hook 8 on the hereinafter described arm. A stiffener 15 extends along the free edge of the apron between the loops 7, being secured to the apron in a suitable pocket. To each arm socket 4 is pivotally secured a radius arm 9, said arm being held in any position by means of a screw clamp 10 or other suitable device. The free ends of the arms 9 are each provided with a hook 8 adapted to engage the loop 7 of said apron 5, and with a socket for the outer arm 11. These arms 11 are pivoted to the ends of the radius arms 9 and are held in any position relative thereto by means of the screw clamps 12. The arms 9 and 11 are preferably made tapered in shape. The outer arms 11 are slightly shorter than the radius arms 9. The upper removable flap 13 consists of a body of canvas or other suitable flexible material, in which are inserted at suitable positions the transparent bodies 14, such as glass or clear celluloid, and is secured between the two outer arms 11 by having its edges formed with loops or pockets adapted to slip over the ends of said arms 11. The flap 13 extends down a short distance below the pivot of the arms 11.

The operation of my improved storm-front can be briefly described as follows:— When it is in use the arms 9 are set so as to extend upward and toward the rear thus bringing their ends slightly above the level of the steering wheel, and the outer arms 11 are set vertically up from the ends of the arms 9; then the apron 5 is drawn out from the roller 6 and the loops 7 thereof are hooked over the hooks 8 on the radius arms 9; then the flap 13 is drawn down over the arms 11. In this position the device forms a complete storm-front for the automobile. If, however, a wind-break is all that is desired then the apron 5 is loosed from the hooks 8 and the arms 11 are turned forward until they lie almost beside the radius arms 9; then the apron 5 is drawn out to cover the downturned flap 13 and is again fastened to the hooks 8. But if the device is not to be used at all, then the flap 13 is removed from the arms 11 and is folded or rolled with the folding top of the automobile or packed in any other suitable place; the apron 5 is loosed from the hooks 8 and allowed to roll up on the roller 6; the arms 11 are turned to lie directly beside the radius arms 9, and the arms 9 are turned down to vertical position to lie beside the rods 2.

Having described my invention what I claim is:—

In a storm-front for vehicles, the combination of a pair of shaped pieces fixedly secured to each side of the vehicle; a pair of roller brackets formed integral on said shaped pieces; a spring roller removably mounted on said brackets across the vehicle; an apron mounted on said roller; pivots formed on said fixed shaped pieces; a pair of radius arms mounted on said pivots and adjustable thereabout; hooks formed on the outer ends of said radius arms; loops secured to the corners of the free end of said apron and adapted to engage said hooks; a stiffener mounted across the apron adjacent said loops whereby the apron is held taut between the loops and the spring roller;

an extension shield of flexible material; pockets formed in the side edges of the extension shield; a pair of outer arms pivotally mounted on the free ends of said radius arms and adjustable relative thereto and adapted to be inserted in said pockets whereby the extension shield is held in adjustable relation to the vehicle and the apron; and a flap extending downward from the extension shield and covering the upper end of the apron.

In testimony whereof I affix my signature in presence of two witnesses.

JAMES E. STEVENSON.

Witnesses:
M. F. McNEIL,
FRANK D. BENTLEY.